US007093077B2

(12) United States Patent
Cooksey et al.

(10) Patent No.: US 7,093,077 B2
(45) Date of Patent: Aug. 15, 2006

(54) METHOD AND APPARATUS FOR NEXT-LINE PREFETCHING FROM A PREDICTED MEMORY ADDRESS

(75) Inventors: Robert N. Cooksey, Hillsboro, OR (US); Stephan J. Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 10/163,977

(22) Filed: Jun. 5, 2002

(65) Prior Publication Data

US 2003/0105939 A1   Jun. 5, 2003

Related U.S. Application Data

(63) Continuation-in-part of application No. 09/999,518, filed on Nov. 30, 2001, now Pat. No. 6,954,840, and a continuation-in-part of application No. 10/000,549, filed on Nov. 30, 2001, now Pat. No. 6,675,280.

(51) Int. Cl.
   *G06F 12/00*   (2006.01)
(52) U.S. Cl. .................. 711/137; 711/204; 711/213
(58) Field of Classification Search ............. 711/137
   See application file for complete search history.

(56) References Cited

U.S. PATENT DOCUMENTS

| 4,980,823 A | 12/1990 | Liu ............................ 364/200 |
| 5,317,718 A | 5/1994 | Jouppi ........................ 395/425 |
| 5,357,618 A | 10/1994 | Mirza et al. ................. 395/400 |
| 5,423,014 A | 6/1995 | Hinton et al. ............... 395/400 |
| 5,500,948 A | 3/1996 | Hinton et al. ............... 395/415 |
| 5,664,147 A | 9/1997 | Mayfield ..................... 395/464 |
| 5,666,505 A | 9/1997 | Bailey ......................... 395/383 |
| 5,694,568 A | 12/1997 | Harrison, III et al. ....... 395/414 |
| 5,701,448 A | 12/1997 | White .......................... 395/580 |
| 5,724,422 A | 3/1998 | Shang et al. .................... 380/4 |
| 5,740,399 A | 4/1998 | Mayfield et al. ............ 395/464 |
| 5,752,037 A | 5/1998 | Gornish et al. ............. 395/709 |
| 5,758,119 A | 5/1998 | Mayfield et al. ............ 395/449 |
| 5,764,946 A | 6/1998 | Tran et al. .................. 395/464 |
| 5,765,214 A | 6/1998 | Sywyk ........................ 711/213 |
| 5,778,423 A | 7/1998 | Sites et al. .................. 711/118 |
| 5,991,848 A | 11/1999 | Koh ............................. 711/3 |
| 6,012,135 A | 1/2000 | Leedom et al. ............. 711/208 |
| 6,055,622 A | 4/2000 | Spillinger ................... 712/207 |

(Continued)

FOREIGN PATENT DOCUMENTS

EP      1150213 A1    10/2001

OTHER PUBLICATIONS

Steven P. Vanderwiel et al, "Data Prefetch Mechanisms," ACM Computing Surveys, vol. 32, No. 2, Jun. 2000, pp. 174-199.*

(Continued)

*Primary Examiner*—Gary Portka
*Assistant Examiner*—Mardochee Chery
(74) *Attorney, Agent, or Firm*—Kerry D. Tweet

(57) ABSTRACT

A method and apparatus for issuing one or more next-line prefetch requests from a predicted memory address. The first issued next-line prefetch request corresponds to a cache line having a memory address contiguous with the predicted memory address. Any subsequent next-line prefetch request corresponds to a cache line having a memory address contiguous with a memory address associated with a preceding next-line prefetch request.

33 Claims, 13 Drawing Sheets

U.S. PATENT DOCUMENTS

| | | | |
|---|---|---|---|
| 6,076,151 A | 6/2000 | Meier | 711/171 |
| 6,079,005 A | 6/2000 | Witt et al. | 711/213 |
| 6,081,479 A | 6/2000 | Ji et al. | 365/233 |
| 6,085,291 A | 7/2000 | Hicks et al. | 711/137 |
| 6,092,186 A | 7/2000 | Betker et al. | 712/233 |
| 6,098,154 A | 8/2000 | Lopez-Aguado et al. | 711/137 |
| 6,119,221 A | 9/2000 | Zaiki et al. | 712/237 |
| 6,131,145 A | 10/2000 | Matsubara et al. | 711/137 |
| 6,138,212 A | 10/2000 | Chiacchia et al. | 711/137 |
| 6,161,166 A | 12/2000 | Doing et al. | 711/125 |
| 6,212,603 B1 | 4/2001 | McInerney et al. | 711/125 |
| 6,247,107 B1 | 6/2001 | Christie | 711/216 |
| 6,275,918 B1 | 8/2001 | Burky et al. | 712/213 |
| 6,292,871 B1 | 9/2001 | Fuente | 711/136 |
| 6,295,594 B1 | 9/2001 | Meier | 711/171 |

OTHER PUBLICATIONS

Cooksey, et al., "Content-Based Prefetching: Initial Results", presented at 2nd workshop on Intelligent Memory Systems (IMS00), Nov. 2000, pp. 1-17.

Roth, et al., "Dependence Based Prefetching for Linked Data Structures", In the proceedings of the 8th International Conference on Architectural Support of Programming Languages and Operating Systems, Oct. 1998, pp. 115-126.

Boehm, "Hardware and Operating System Support for Conservative Garbage Collection", Xerox PARC, Palo Alto, CA, 1991 IEEE, pp. 61-67.

Charney, et al., "Generalized Correlation-Based Hardware Prefetching", School of Electrical Engineering, Cornell University, Ithaca, NY, Technical Report No. EE-CEG-95-1, Feb. 13, 1995, pp. 1-45.

Chen, et al., "Reducing Memory Latency via Non-Blocking and Prefetching Caches", Department of Computer Science and Engineering, University of Washington, Seattle, WA, 1992, pp. 51-61.

Joseph, et al., "Prefetching Using Markov Predictors", IBM T.J. Watson Research Lab, Yorktown Heights, NY, 1997, pp. 252-263.

Jouppi, "Improving Direct-Mapped Cache Performance by the Addition of a Small Fully-Associative Cache and Prefetch Buffers", Digital Equipment Corporation Western Research Lab, Palo Alto, CA, 1990 IEEE, pp. 364-373.

Lipasti, et al., "SPAID: Software Prefetching in Pointer-and Call-Intensive Environments", IBM Corporation, Rochester, MN, 1995 IEEE, pp. 231-236.

Luk, et al., "Compiler-Based Prefetching for Recursive Data Structures", Department of Computer Science, Department of Electrical and Computer Engineering, University of Toronto, Toronto, Canada, 1996, pp. 222-233.

Mowry, et al., "Design and Evaluation of a Compiler Algorithm for Prefetchng", Computer Systems Laboratory, Standford University, CA, 1992, pp. 62-73.

Ozawa, et al., "Cache Miss Heuristics and Preloading Techniques for General-Purpose Programs", Fujitsu Laboratories Ltd., Kawasaki, Japan, 1995 IEEE, pp. 243-248.

Palacharla, et al., "Evaluating Stream Buffers as a Secondary Cache Replacement", Computer Sciences Department, University of Wisconsin, Madison, WI, 1994 IEEE, pp. 24-33.

Yang, et al., "Push vs. Pull: Data Movement for Linked Data Structures", Department Computer Science, Duke University, Durham, NC, 2000, pp. 176-186.

Patterson et. al.,Computer Architecture A Quantitative Approach, Second Edition, Published 1996, pp. 1-5.

Tanenbaum et. al., Structured Computer Organization, Fouth Edition, Published 1999, pp. 1-3.

\* cited by examiner

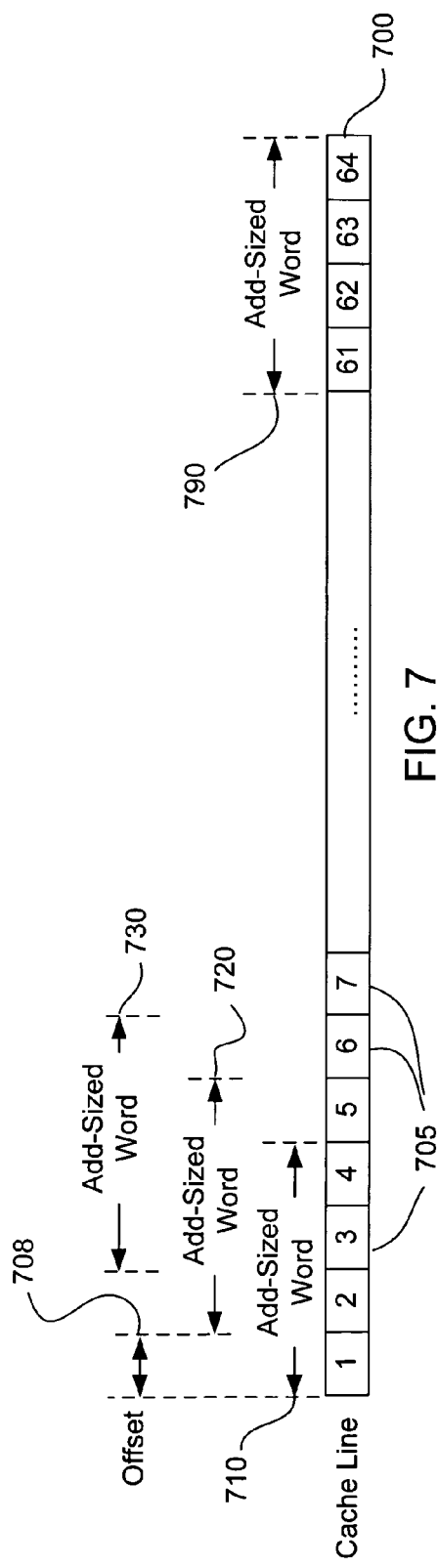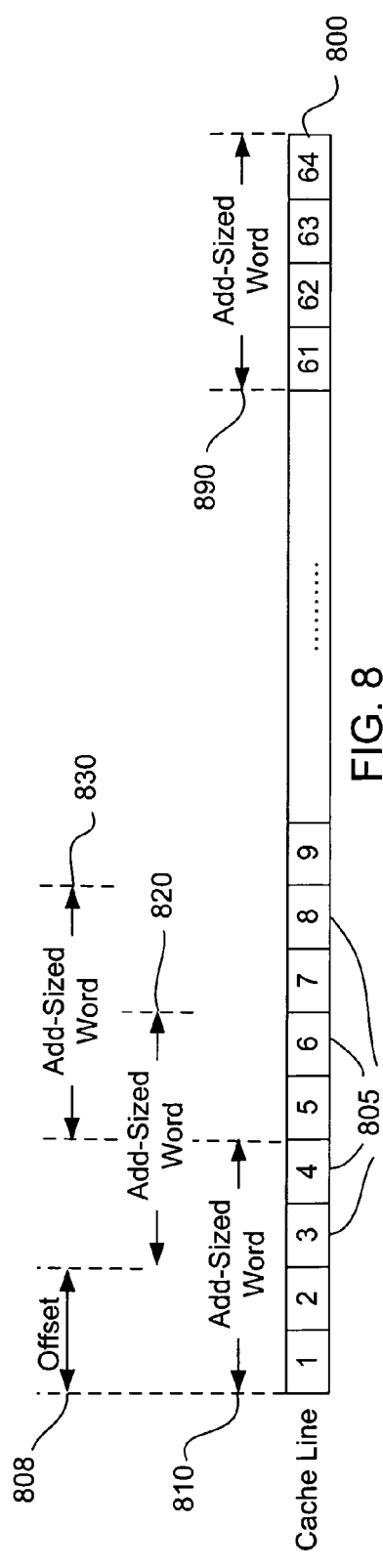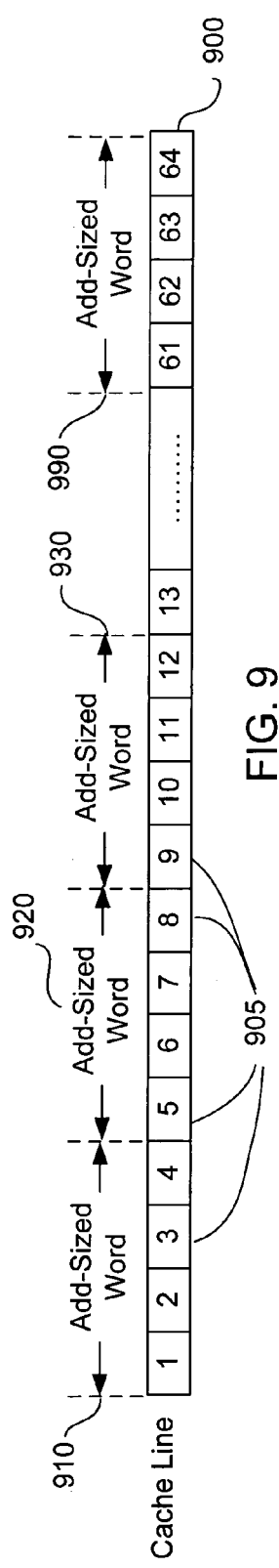

METHOD AND APPARATUS FOR NEXT-LINE PREFETCHING FROM A PREDICTED MEMORY ADDRESS

CLAIM OF PRIORITY

This application is a continuation-in-part of U.S. patent application Ser. Nos. 09/999,518, entitled "Method and Apparatus for Content-Aware Prefetching", now U.S. Pat. No. 6,954,840, and 10/000,549, entitled "Method and Apparatus for Identifying Candidate Virtual Addresses in a Content-Aware Prefetcher", now U.S. Pat. No. 6,675,280, both of which were filed on Nov. 30, 2001.

FIELD

Embodiments of the invention relate generally to prefetching within the memory hierarchy of a processor and, more particularly, to a method and apparatus for next-line prefetching from a predicted memory address.

BACKGROUND

A conventional processor typically operates at a much faster speed than the main memory to which the processor is coupled. To overcome the inherent latency of main memory, which usually comprises dynamic random access memory (DRAM), a memory hierarchy is employed. The memory hierarchy includes one or more levels of cache, each cache comprising a relatively fast memory device or circuitry configured to hold data recently accessed—or expected to be accessed—by the processor. The purpose of the cache is to insure most data needed by a processor is readily available to the processor without accessing the main memory, as the process of accessing main memory is very slow in comparison to the speed of the processor or the speed at which the processor can access a cache.

Typically, a memory hierarchy comprises multiple levels of cache, wherein each level is faster than next lower level and the level closest to the processor exhibits the highest speed and performance. A cache may be located on the processor itself—i.e., an "on-chip" cache—or a cache may comprise an external memory device—i.e., an "off-chip" cache. For example, a processor may include a high level on-chip cache—often times referred to as an "L1" cache—wherein the processor is coupled with a lower level off-chip cache—which is often referred to as an "L2" cache. Alternatively, a processor may include an on-chip L1 cache, as well as an on-chip L2 cache. Of course, a memory hierarchy may include any suitable number of caches, each of the caches located on-chip or off-chip.

As noted above, each level of cache may hold data recently accessed by the processor, such recently accessed data being highly likely—due to the principles of temporal and spatial locality—to be needed by the processor again in the near future. However, system performance may be further enhanced—and memory latency reduced—by anticipating the needs of a processor. If data needed by a processor in the near future can be predicted with some degree of accuracy, this data can be fetched in advance—or "prefetched"—such that the data is cached and readily available to the processor. Generally, some type of algorithm is utilized to anticipate the needs of a processor, and the value of any prefetching scheme is dependent upon the degree to which these needs can be accurately predicted.

One conventional type of prefetcher is commonly known as a "stride" prefetcher. A stride prefetcher anticipates the needs of a processor by examining the addresses of data requested by the processor—i.e., a "demand load"—to determine if the requested addresses exhibit a regular pattern. If the processor (or an application executing thereon) is stepping through memory using a constant offset from address to address—i.e., a constant stride—the stride prefetcher attempts to recognize this constant stride and prefetch data according to this recognizable pattern. Stride prefetchers do, however, exhibit a significant drawback. A stride prefetcher does not function well when the address pattern of a series of demand loads is irregular—i.e., there is not a constant stride—such as may occur during dynamic memory allocation.

Another method of data prefetching utilizes a translation look-aside buffer (TLB), which is a cache for virtual-to-physical address translations. According to this method, the "fill contents"—i.e., the requested data—associated with a demand load are examined and, if an address-sized data value matches an address contained in the TLB, the data value likely corresponds to a "pointer load"—i.e., a demand load in which the requested data is an address pointing to a memory location—and is, therefore, deemed to be a candidate address. A prefetch request may then be issued for the candidate address. Because the contents of the requested data—as opposed to addresses thereof—are being examined, this method may be referred to as content-based, or content-aware, prefetching. Such a content-aware prefetching scheme that references the TLB (or, more generally, that references any external source or index of addresses) has a significant limitation: likely addresses are limited to those cached in the TLB, and this constraint significantly reduces the number of prefetch opportunities. Also, this content-aware prefetching scheme requires a large number of accesses to the TLB; thus, additional ports must be added to the TLB to handle the content prefetcher overhead.

BRIEF DESCRIPTION OF THE DRAWINGS

FIGS. 7 through 9 are schematic diagrams, each further illustrating the method shown in FIG. 6.

DETAILED DESCRIPTION

Figure 1:
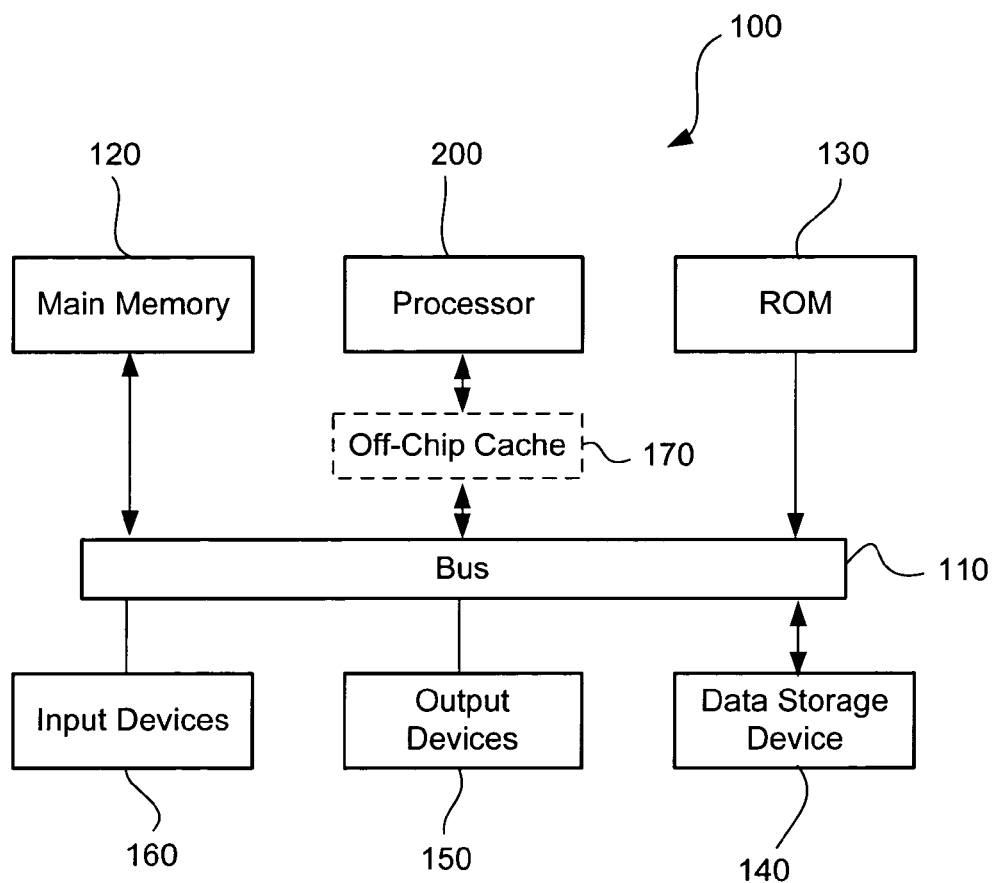
FIG. 1 is a schematic diagram of an exemplary embodiment of a system including a processor having a content prefetcher.

Referring to FIG. 1, a system 100 includes a bus 110 having a processor 200 coupled therewith. The processor 200 may comprise any suitable processing device or circuitry. In one embodiment, as will be discussed below, the processor 200 includes only on-chip cache. However, in an alternative embodiment, the processor 200 may include off-chip cache 170—which may be provided alone or in combination with on-chip cache—coupled with the processor 200.

A main memory 120 is coupled with the bus 110, the main memory 120 comprising, for example, dynamic random access memory (DRAM). The main memory 120 may contain data and/or instructions to be used by the processor 200 while executing an application. A read only memory (ROM) 130 may also be coupled with the bus 110. The ROM 130 may store instructions for execution on processor 200. Further, a data storage device 140, such as a hard disk drive or other suitable non-volatile memory, may be coupled with the bus 110.

The system 100 may also include one or more output devices 150 coupled with the bus 110. Common output devices 150 include video monitors, printers, and audio output devices (e.g., a sound card and/or speakers). The system 100 may further include one or more input devices 160 coupled with the bus 110. Typical input devices include keyboards, pointing devices such as a mouse, as well as scanners and other data entry devices. It should be understood that the system 100 may include other components in addition to those illustrated in FIG. 1, which have been omitted for clarity, including a removable storage media (e.g., floppy disk drive, CD-ROM drive), a network interface, a chip set coupled with the processor, as well as additional signal lines and busses.

Figure 2:
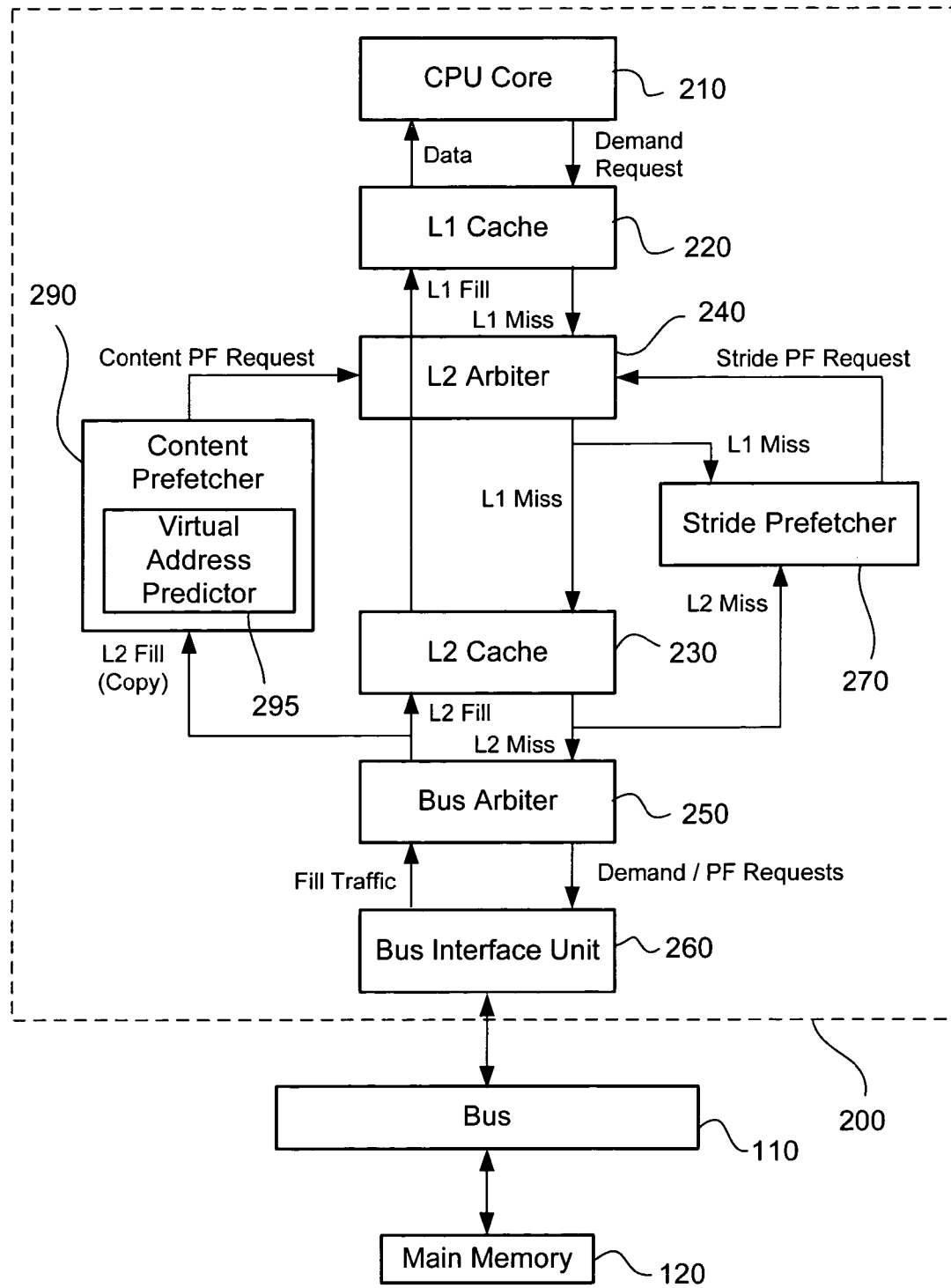
FIG. 2 is a schematic diagram of an exemplary embodiment of a processor including an embodiment of a content prefetcher having a virtual address predictor.

Referring now to FIG. 2, the processor 200 includes a CPU (central processing unit) core 210. Coupled with the CPU core 210 is a first level on-chip cache, or "L1 cache," 220. A second level on-chip cache, or "L2 cache," 230 is also disposed in the processor 200. An arbiter, which will be referred to herein as the "L2 arbiter" 240, is coupled with each of the L1 and L2 caches 220, 230. Another arbiter, which will be referred to herein as the "bus arbiter" 250, is coupled with the L2 cache. The bus arbiter 250 is also coupled with a bus interface unit 260. The bus interface unit 260 couples the processor 200 with bus 110, thereby enabling communication between processor 200 and main memory 120. The L1 and L2 caches 220, 230 may each comprise any suitable type of memory or circuitry.

The L1 cache 220 and L2 cache 230, in conjunction with main memory 120, provide a memory hierarchy for CPU core 210. Generally, the L1 cache 220 exhibits the highest speed relative to the CPU core 210, whereas the main memory 120 exhibits the lowest relative speed. The L2 cache 230 operates much faster than the main memory 120, but may be slower than L1 cache 220. The data storage device 140 (see FIG. 1) may also be considered a part of the memory hierarchy, the data storage device 140 being the slowest element in the hierarchy. Each of the L1 and L2 caches 220, 230 store data and/or instructions recently accessed, or expected to be accessed, by CPU core 210.

During operation, if the CPU core 210 requests data—i.e., a "demand load" or a "demand request"—the L1 cache 220 is accessed to determine whether it contains the requested data and, if so, the data is provided to the CPU core 210. If the L1 cache 220 does not contain the requested data—i.e., a "cache miss"—the demand request is passed to the L2 arbiter 240. The L2 arbiter 240 then provides the demand request to the L2 cache 230, and the L2 cache 230 is accessed to determine whether it contains the requested data. If the L2 cache 230 contains the requested data, the requested data—i.e., the "fill content"—is forwarded to the L1 cache 220 and on to the CPU core 210. If the demand load is not met by the L2 cache 230, the load is passed to the bus arbiter 250. The bus arbiter 250 will transmit the demand request off-chip to main memory 120. If the main memory 120 holds the requested data, the fill content is passed up the memory hierarchy to the CPU core 210. If the main memory 120 can not satisfy the demand request, data storage device 140 may be accessed. Each of the L2 and bus arbiters 240, 250 includes a buffer memory, and the L2 and bus arbiters 240, 250 may buffer a demand request if multiple loads are in progress. During memory request arbitration, the L2 and bus arbiters 240, 250 may also buffer prefetch requests, as will be explained below.

A process executing in CPU core 210 may access a virtual address space. Typically, such a virtual address space is maintained by a memory management unit, or MMU (not shown in figures). To access virtually addressed data, the virtual address (or addresses) must be mapped to a physical address—i.e., an actual location in main memory 120. Thus, it should be understood that, as data traverses the memory hierarchy, the data may undergo a virtual-to-physical address translation. For example, the L1 cache 220 may be virtually indexed and the L2 cache 230 physically indexed; therefore, if there is a cache miss at L1 cache 220, a virtual-to-physical address translation is required before accessing the L2 cache 230.

As suggested above, system performance can be enhanced by anticipating the needs of CPU core 210 and prefetching any data that is likely to be imminently requested by the CPU core 210. The processor 200 may include a stride prefetcher 270 coupled with the L2 arbiter 240 and L2 cache 230. The stride prefetcher 270 monitors the L1 miss traffic—i.e., demand loads that have missed at L1 cache 220—as well as the L2 miss traffic—i.e., demand loads that have missed at L2 cache 230—and attempts to detect a constant stride in the requested addresses. If a constant stride is detected, prefetch (PF) requests are provided to the L2 arbiter 240 based upon the detected stride. However, as suggested above, the stride prefetcher 270 does not function adequately when the address pattern of successive demand requests is irregular and there is not a constant stride (e.g., which may occur during dynamic memory allocation).

The processor 200 also includes a novel content prefetcher 290. The content prefetcher 290 is coupled with the L2 cache 230 and receives a copy of all fill content directed to L2 cache 230, the fill content including one or more cache lines. More generally, however, the content prefetcher 290 may be coupled with any level in the memory hierarchy of a processor and receives a copy of all fill content directed thereto. Further, although the content prefetcher 290 of processor 200 is coupled with an on-chip L2 cache 230, it should be understood that the content prefetcher 290 may also be coupled with an off-chip cache, such as the off-chip cache 170 illustrated in FIG. 1. The content prefetcher 290 is also coupled with the L2 arbiter 240.

The content prefetcher 290 includes a virtual address predictor 295. As previously described, the content prefetcher 290 receives a copy of each cache line received at L2 cache 230. The virtual address predictor 295 examines a cache line and differentiates candidate virtual addresses from other data values and random bit patterns contained in the cache line without reference to any external address source—i.e., a TLB—which may unnecessarily constrain the range of potential addresses and, hence, the potential prefetch opportunities. The virtual address predictor 295 comprises any suitable circuitry and/or instructions capable of identifying candidate virtual addresses in a cache line based upon the data contained in the cache line itself, without accessing an external address reference.

Figure 3:
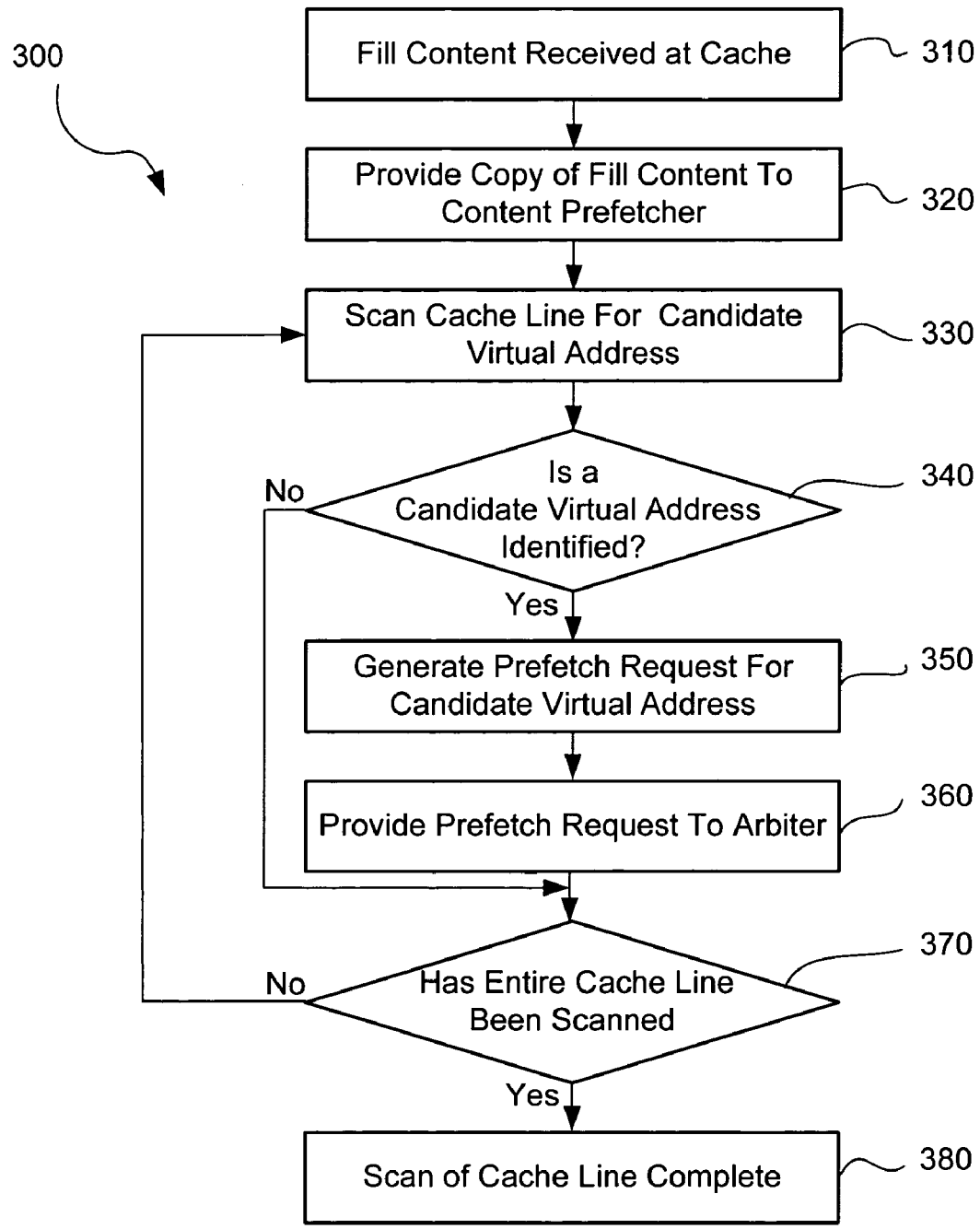
FIG. 3 is a flow chart illustrating an embodiment of a method of content-aware prefetching.

Operation of the content prefetcher 290 and virtual address predictor 295 may be better understood with reference to a method 300 of content-aware prefetching shown in FIG. 3. Referring to reference numeral 310 in FIG. 3, fill content is received at L2 cache 230. A copy of the fill content is provided to the content prefetcher 290, as denoted at 320. The fill content includes a cache line (or, alternatively, the fill content includes two or more cache lines). As shown at reference numeral 330, the cache line is scanned for candidate virtual addresses. If a candidate virtual address is identified by virtual address predictor 295—see reference numeral 340—the content prefetcher 290 generates a prefetch request corresponding to the identified candidate virtual address, as illustrated by reference numeral 350. The content prefetcher 290 then provides the prefetch request to the L2 arbiter 240—see reference numeral 360—which may buffer and/or issue to main memory 120 a prefetch request based upon memory request arbitration, as will be described below.

The above-described process is continued until the entire cache line has been scanned. When the entire cache line has been scanned—see reference numeral 370—and all candidate virtual addresses contained in the cache line identified, the scan of the cache line is complete, as shown at 380. As will be described in greater detail below, the entire cache line—or a portion thereof—may be scanned in parallel.

As described above, a copy of all fill content directed to the L2 cache 230 is provided to the content prefetcher 290. Thus, for each demand request issued by the CPU core 210 resulting in a cache miss at L2 cache 230—or, more generally, resulting in a cache miss at the level of cache with which the content prefetcher 290 is coupled—the content prefetcher 290 will receive a copy of the requested data. The fill contents associated with demand requests that have missed at some level of cache in the memory hierarchy may be referred to as the "demand reference stream." However, other fill content will be directed to the L2 cache 230 as a result of prefetch requests issued by the L2 arbiter 240 (or bus arbiter 250)—i.e., the "prefetch reference stream"—and a copy of fill content associated with the prefetch reference stream is also provided to the content prefetcher 290. Thus, by examining fill content associated with the demand reference stream as well as that fill content associated with the prefetch reference stream, the content prefetcher 290 includes a recurrence component and may provide prefetch requests based upon prior prefetch requests. Such a recurrence component allows the content prefetcher 290 to follow a recursive path within a data structure, such as a "linked data structure" (i.e., a data structure in which each element contains a pointer to the next element of the structure). A prefetch request provided by the content prefetcher 290 based upon a prior prefetch request may be referred to as a "chained" prefetch request.

When the L2 arbiter 240 receives a prefetch request from the content prefetcher 290—the prefetch request corresponding to a candidate virtual address identified by the virtual address predictor 295—the L2 arbiter 240 may buffer the prefetch request and delay it issuance. Buffering of prefetch requests (as well as, in some instances, demand requests) in the L2 arbiter may be (and, in most instances, is) necessary due to the low bandwidth of bus 110 and the slow access speed of main memory 120. Accordingly, the L2 arbiter 240, as well as the bus arbiter 250, may implement a prioritizing scheme to determine which among multiple prefetch requests, as well as multiple demand requests, contained in its buffer should be issued first. This process of prioritizing memory requests and issuing demand or prefetch requests according to each request's priority may be referred to as memory request arbitration.

Demand requests generally should be accorded the highest priority, as a demand request corresponds to data currently needed by the CPU core 210. Prefetch requests are generally accorded a priority lower than that of demand requests; however, not all prefetch requests in a recursive chain of prefetch requests are as likely to represent data imminently needed by the CPU core 210—i.e., they are more speculative—and, therefore, should be assigned differing priorities. That the content prefetcher 290 provides a recursive component providing a chain of prefetches—the first in the chain based upon the fill content associated with a demand request and each successive prefetch request in the chain based upon the fill content resulting from a previous prefetch—leads to the notion of a "request depth." If a demand request is, for example, assigned a request depth of zero (0), a prefetch request resulting from the fill content associated with a demand request is assigned a request depth of one (1), and each successive chained prefetch is assigned a request depth equal to one (1) more than the prefetch request upon which the chained prefetch request is based.

The above-described request depth provides a measure of confidence in a prefetch request and may be used by the L2 arbiter 240, as well as by the bus arbiter 250, during memory request arbitration to determine the priority of a prefetch request. Memory requests with the lowest request depth may be assigned the highest priority and issued first by the L2 arbiter 240 (or bus arbiter 250). Demand requests have a request depth of, for example, zero and are assigned the highest priority. Prefetch requests resulting from fill content associated with a demand load are assigned the next highest priority. A chained prefetch requests is assigned a priority commensurate with its request depth, the assigned priority inversely proportional to the request depth. Accordingly, chained prefetch requests exhibiting a higher request depth are assigned a lower priority, as they are likely to be more speculative. A chained prefetch request having a request depth greater than a predefined threshold—a threshold at which confidence in the prefetch request is low—are squashed and a prefetch request is not issued by an arbiter. Prefetch requests of the same priority (i.e., the same request depth) are scheduled for issuance by the L2 arbiter 240 (or bus arbiter 250) in a first-come-first-served manner.

Figure 4:
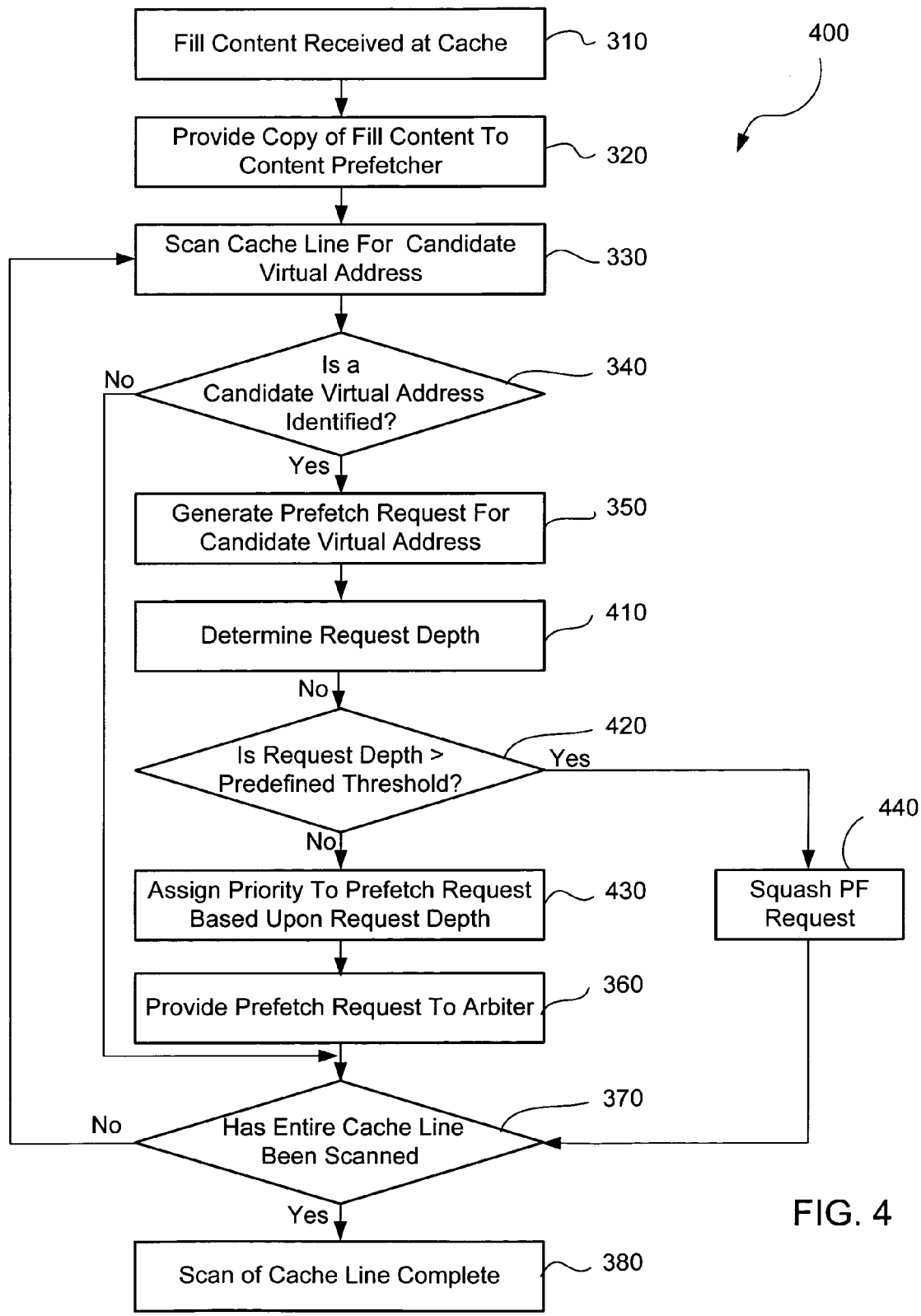
FIG. 4 is a flow chart illustrating another embodiment of the method of content-aware prefetching.

A method 400 of content-aware prefetching and determining a priority of each prefetch request is illustrated in FIG. 4. It should be noted that the method 400 shown in FIG. 4 includes many elements identical to the method 300 of FIG. 3, and like elements retain the same reference numeral in FIG. 4.

Referring to reference numeral 310 in FIG. 4, fill content is received at L2 cache 230, and a copy of the fill content is provided to the content prefetcher 290 (see reference numeral 320). The fill content includes a cache line (or, alternatively, the fill content includes two or more cache lines). The cache line is then scanned for candidate virtual addresses, as denoted at 330. If a candidate virtual address is identified by virtual address predictor 295—see reference numeral 340—the content prefetcher 290 generates a prefetch request for that address, as shown at 350.

Referring now to reference numeral 410 in FIG. 4, the content prefetcher 290 determines a request depth of the prefetch request, as described above. If the request depth is greater than the predefined threshold—see reference numeral 420—the prefetch request is squashed, as denoted at 440. If the request depth does not exceed the predefined threshold, a priority is assigned to the prefetch—see reference numeral 430—wherein the priority is based upon the request depth, as previously described.

Once a priority is assigned to the prefetch request, the content prefetcher 290 provides the prefetch request to the L2 arbiter 240, as shown at 360. The L2 arbiter 240 enqueues the prefetch request in buffer memory pending memory request arbitration based upon the priority of each prefetch request held in its buffer. Again, demand requests have the highest priority and are issued first by the L2 arbiter 240 (and bus arbiter 250). Prefetch requests, which have a priority lower than demand requests, are issued by the L2 arbiter 240 (or bus arbiter 250) in accordance with their respective priority. Again, the priority of a prefetch request is based upon that prefetch request's request depth. The process is continued until the entire cache line has been scanned and, when the entire cache line has been scanned (see reference numeral 370) and all candidate virtual addresses contained in the cache line identified, the scan of the cache line is complete, as shown at 380.

Figure 5:
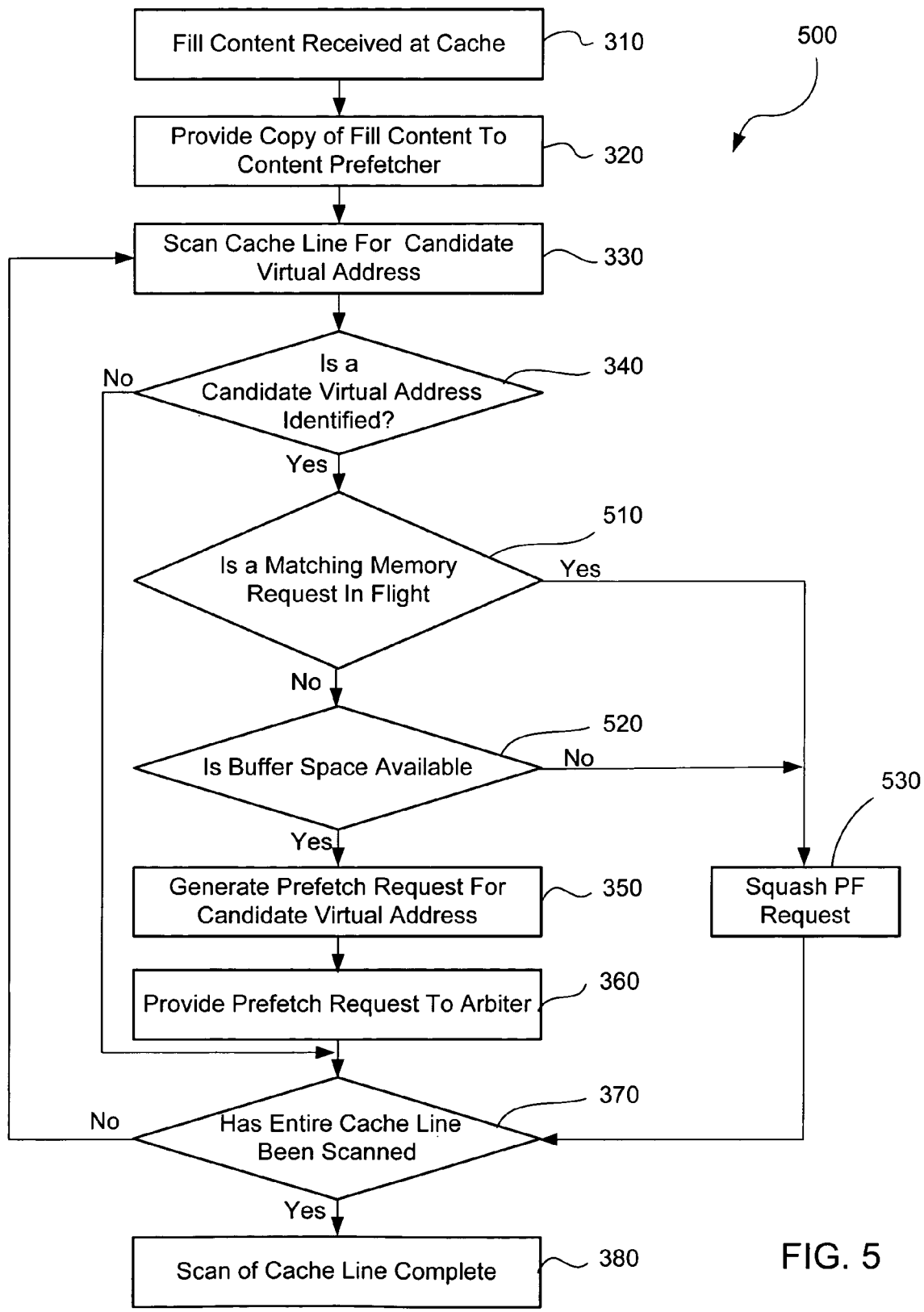
FIG. 5 is a flow chart illustrating a further embodiment of the method of content-aware prefetching.

A further embodiment of a method 500 of content-aware prefetching is illustrated in FIG. 5. It should be noted that the method 500 shown in FIG. 5 includes many elements identical to the method 300 of FIG. 3, and like elements retain the same reference numeral in FIG. 5. Also, the method 500 of content-aware prefetching is similar to the method 300 illustrated in FIG. 3, and a detailed description of those elements previously described is not repeated.

Referring to reference numeral 510, if a candidate virtual address has been identified (see reference numeral 340), both of the L2 and bus arbiters 240, 250 are polled to see if a matching memory request is currently in-flight—i.e., a memory request corresponding to the candidate virtual address has already been issued. If a matching memory request is in-flight, the prefetch request is squashed, as shown at reference numeral 530. In the event a prefetch request is squashed due to an in-flight memory request, scan of the cache line continues (see reference numerals 330, 370).

Prefetch requests are enqueued in a memory buffer of the L2 arbiter 240 (or bus arbiter 250) pending memory request arbitration, as previously described. In some instances, the L2 arbiter's buffer may become full. If no buffer space is available in the L2 arbiter 240—see reference numeral 520—the prefetch request is squashed, as illustrated at reference numeral 530. In the event a prefetch request is squashed due to a lack of available buffer space, the scan of the cache line may continue—see reference numerals 330, 370—as memory space may again become available in the L2 arbiter's buffer.

As set forth above, the virtual address predictor 295 of content prefetcher 290 differentiates—without reference to an external address source, such as a TLB, which may limit the range of prefetch opportunities—candidate virtual addresses from data values and random bit patterns contained within a cache line. A method of identifying candidate virtual addresses, as may be implemented by virtual address predictor 295, is now disclosed. It should be noted that the method of identifying candidate virtual addresses "looks" for virtual addresses—as opposed to physical addresses—because likely addresses contained in fill content directed to the CPU core 210 are in the virtual address space, even though a virtual-to-physical address translation may have taken place within the memory hierarchy.

The method of identifying candidate virtual addresses is based on the premise that if a pointer load—i.e., a demand load in which the requested data is an address pointing to a memory location—is loaded from memory, there is a strong likelihood that the address of the pointer load will be the effective address of a future demand request. Central to this premise is the idea that the base address of a data structure is provided via a pointer load, and any data value within that structure that shares this base address can be interpreted as a pointer to another member of the same data structure. Assuming that all demand requests potentially include pointer loads, any address-sized word contained within a cache line returned in response to a demand request that shares this base address is deemed a candidate virtual address. If a number of upper bits of the address-sized word match the same number of upper bits in the effective address of the cache line, these matching upper bits suggests that the address-sized word and the effective address of the cache line were computed from the same base address and, therefore, the address-sized word likely corresponds to the effective address of a future demand load.

Figure 6:
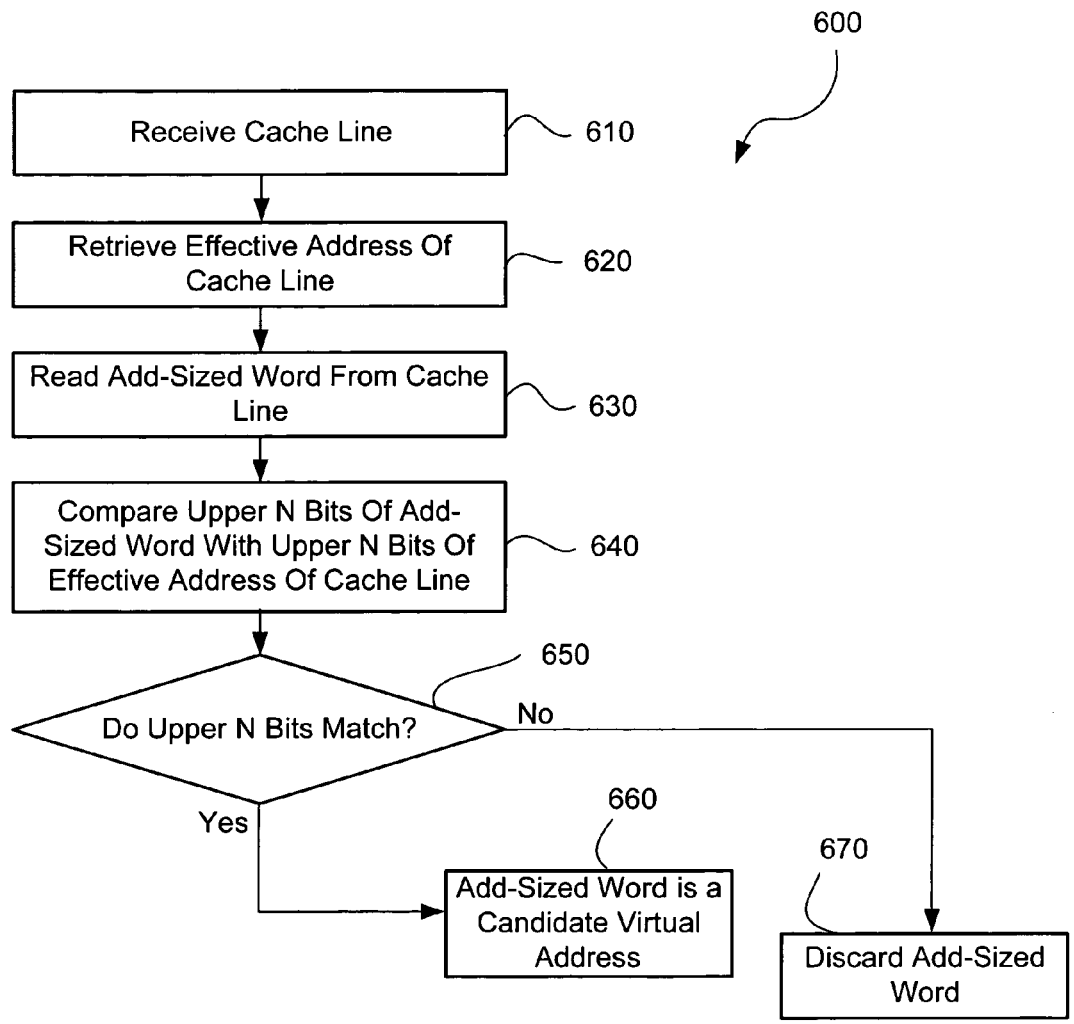
FIG. 6 is a flow chart illustrating an embodiment of a method of identifying candidate virtual addresses.

An exemplary embodiment of a method 600 of identifying candidate virtual addresses is illustrated in FIG. 6. Referring to reference numeral 610, the virtual address predictor 295 receives a cache line. The cache line is included in fill content received at the content prefetcher 290—see FIG. 3, items 310, 320—the fill content received at content prefetcher 290 comprising a copy of fill content directed to L2 cache 230, as noted above. The effective address of the cache line is then retrieved, as denoted by reference numeral 620. The cache line is scanned—see FIG. 3, reference numeral 330—and an address-sized word is read (or otherwise accessed) from the cache line, as illustrated by reference numeral 630. An address-sized word corresponds to thirty-two (32) bits, or four (4) bytes, for a typical processor; however, an address-sized word may be of any suitable length.

The process of reading an address-sized word (or words) from a cache line is further illustrated in FIGS. 7 through 9. Referring to FIG. 7, an exemplary cache line 700 comprises sixty-four (64) bytes 705. It should be understood, however, that a cache line may be of any suitable length (e.g., 128 bytes). A first address-sized word 710 (i.e., the first four bytes) may be read from the cache line. A second address-sized word 720 may be read from the cache line, wherein the start of the second address-sized word 720 is separated from the start of the first address sized word 710 by an offset 708 of one (1) byte. Similarly, a third address-sized word 730 may be read from the cache line, the third address-sized word 730 and second address-sized word 720 separated by an offset of one (1) byte. Other address-sized words may be read from the cache line in a similar fashion until the final address-sized word 790 is read from the cache line.

The process of scanning a cache line illustrated in FIG. 8 is similar to that illustrated in FIG. 7; however, the offset has been increased and the number of address-sized words read from the cache line decreased. A cache line 800 includes, for example, sixty-four (64) bytes 805. Address-sized words 810, 820, 830, . . . 890 are read from the cache line 800, the start of each address-sized word separated from the preceding address-sized word by an offset 808 of two (2) bytes. Thus, the granularity of the cache line scan can be varied by changing the offset 808, 708, thereby altering the number of address-sized words that will be examined. Also, as suggested above, the cache line 800 (or 700) may be scanned in parallel, wherein the entire cache line is scanned at once. It should be understood, however, that when the amount of data that can be read from the cache line is limited by, for example, bus width, the cache line may be scanned in portions, each portion being scanned in parallel.

Referring to FIG. 9, a cache line 900 comprises sixty-four (64) bytes 905. A first address-sized word 910 is read from the cache line 900, the first address-sized word including the first four bytes of the cache line 900. A second address-sized word 920 is read from the cache line, wherein the start of the second address-sized word 920 corresponds to the end of the first address-sized word 910. Stated another way, the first and second address-sized words 910, 920 are separated by an offset of four (4) bytes, which is also the length of each address-sized word to be read from the cache line 900. A third address-sized word 930 read from the cache line 900 is similarly offset by four bytes from the preceding address-sized word.

A data structure stored in memory wherein each element of the data structure is read starting at a word boundary is said to be "memory aligned" or J-byte aligned. For example, the cache line 900 illustrated in FIG. 9 is "4-byte aligned," whereas the cache line 800 of FIG. 8 is 2-byte aligned. As will be explained below, such memory aligned data exhibits certain characteristics which the virtual address predictor 795 may advantageously utilize during operation.

Figure 10:
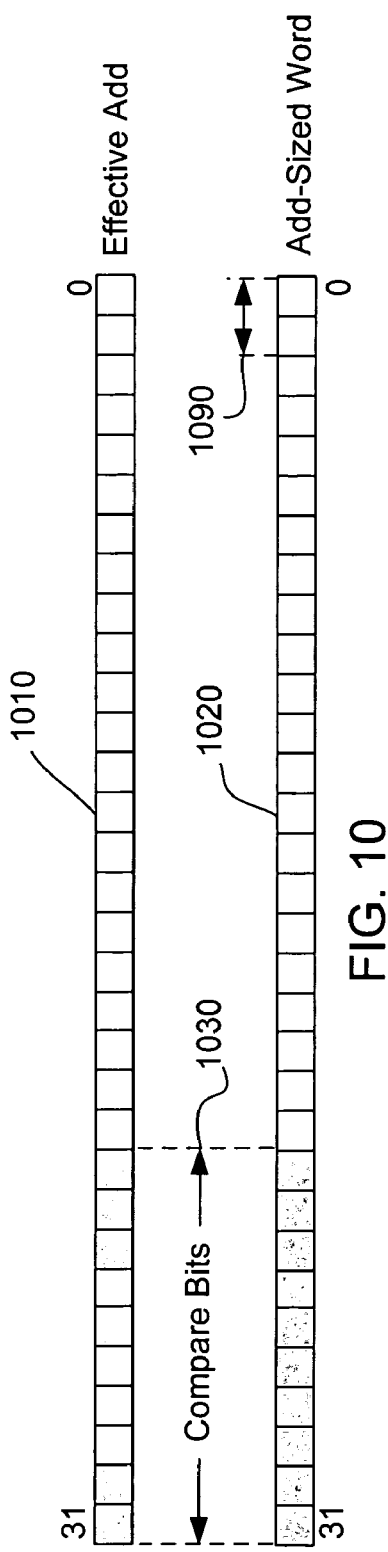
FIG. 10 is a schematic diagram illustrating an embodiment of a process for comparing an address-sized word in a cache line with the cache line's effective address.

Referring again to FIG. 6, once an address-sized word has been read from the cache line, a certain number of the upper bits of the address-sized word are compared against the same number of upper bits in the effective address of the cache line, as denoted at 640. Specifically, an N number of the upper bits of the address-sized word are compared with the upper N bits of the effective address of the cache line. This process is better illustrated with reference to FIG. 10. The upper N bits of the effective address 1010 of a cache line are compared against the upper N bits of an address-sized word 1020 contained in the cache line. The upper N bits of each of the effective address 1010 and the address-sized word 1020, respectively, may be referred to as the compare bits 1030. The upper N bits, or compare bits 1030, may comprise any suitable number of bits. By way of example, for a 32 bit address-sized word, the N compare bits may comprise between 8 and 12 bits.

A bit pattern can be interpreted as a pointer load, a data value, or simply random bits. An address-sized word is deemed to be a pointer to a member of a data structure if the upper N bits thereof match the upper N bits of the effective address of the cache line, which suggests that the address-sized word and the effective address of the cache line were computed from the same base address. If the upper N bits of the address-sized word match the upper N bits of the effective address of the cache line—see reference numeral 650—the address-sized word is identified as a candidate virtual address, as shown at 660, and the content prefetcher 290 may provide a prefetch request for the identified candidate address (see FIGS. 3 through 5). If the upper N bits do not match, the address-sized word is discarded, as illustrated by reference numeral 670. The above-described process—see reference numerals 630, 640, 650, 660, 670—is applied to each address-sized word read from the cache line during the cache line scan.

Figure 11:
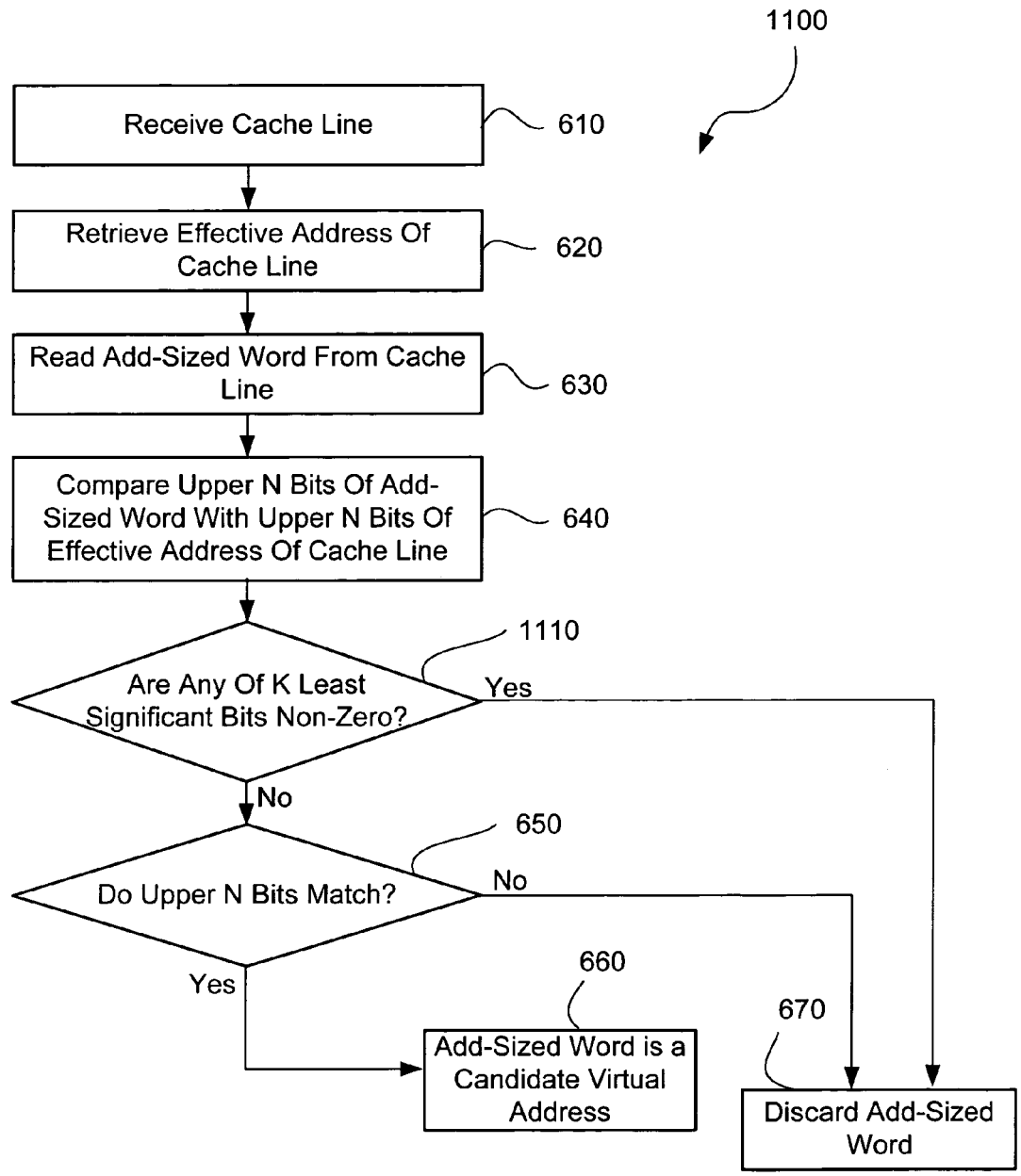
FIG. 11 is a flow chart illustrating another embodiment of the method of identifying candidate virtual addresses.

A further embodiment of the method of identifying candidate virtual addresses is illustrated in FIG. 11. As previously described, a cache line may be memory aligned. For example, a data structure may be 2-byte aligned, 4-byte aligned, 8-byte aligned, 16-byte aligned, or, more generally, J-byte aligned. If the data in a cache line is J-byte aligned, a certain number of the least significant bits (see FIG. 10, reference numeral 1090) of any candidate virtual address will be zero (0). By way of example, for 2-byte aligned data the least significant bit will be zero, for 4-byte aligned data the two least significant bits will be zero, for 8-byte aligned data the three least significant bits will be zero, and for 16-byte aligned data the four least significant bits will be zero. More generally, for J-byte aligned data, the K least significant bits will be zero. The virtual address predictor 295 can use the assumption of memory aligned data to disqualify candidate virtual address. Assuming memory alignment, if any of the K least significant bits of an address-sized word are non-zero, the address-sized word can be disqualified as a candidate virtual address. Referring to FIG. 11, which illustrates a method 1100 substantially similar to the method 600 shown in FIG. 6 (all like elements retaining the same reference numeral), if any of the K least significant bits of the address-sized word read from the cache line are non-zero—see reference numeral 1110—the address-sized word is discarded, as shown at 670.

Figure 12:
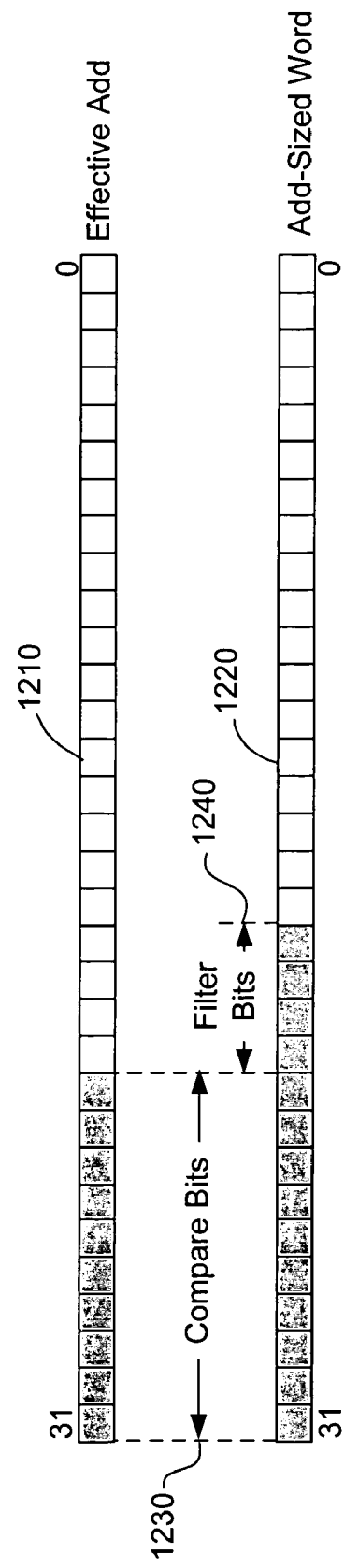
FIG. 12 is a schematic diagram illustrating another embodiment of the process for comparing an address-sized word in a cache line an effective address thereof.

The method 600 (as well as the method 1100) of identifying candidate virtual addresses described above generally functions for any bit pattern contained in the upper bits of the effective address of the cache line, with two exceptions: where the upper N bits are all 0's and where the upper N bits are all 1's (in which case a negative number can potentially be misidentified as a candidate virtual address). However, rather than not predicting when the compare bits of an effective address are all 0's or all 1's, additional filter bits can be used in the comparison to distinguish candidate virtual addresses from data values or random bit patterns. Referring to FIG. 12, the compare bits 1230 of an effective address 1210 of a cache line are either all 1's or all 0's. If the upper N bits of an address-sized word 1220 of the cache line match the upper N bits of the effective address (which are either all 1's or all 0's), additional filter bits 1240 of the address-sized word are examined. The filter bits 1240 comprise the next M bits after the upper N bits or compare bits 1230. If the compare bits 1230 are all 0's and a non-zero bit is found in the filter bit range of an address-sized word, or if the compare bits 1230 are all 1's and a non-one bit is found in the filter bit range of the address-sized word, the address-sized word is deemed a candidate virtual address.

Figure 13:
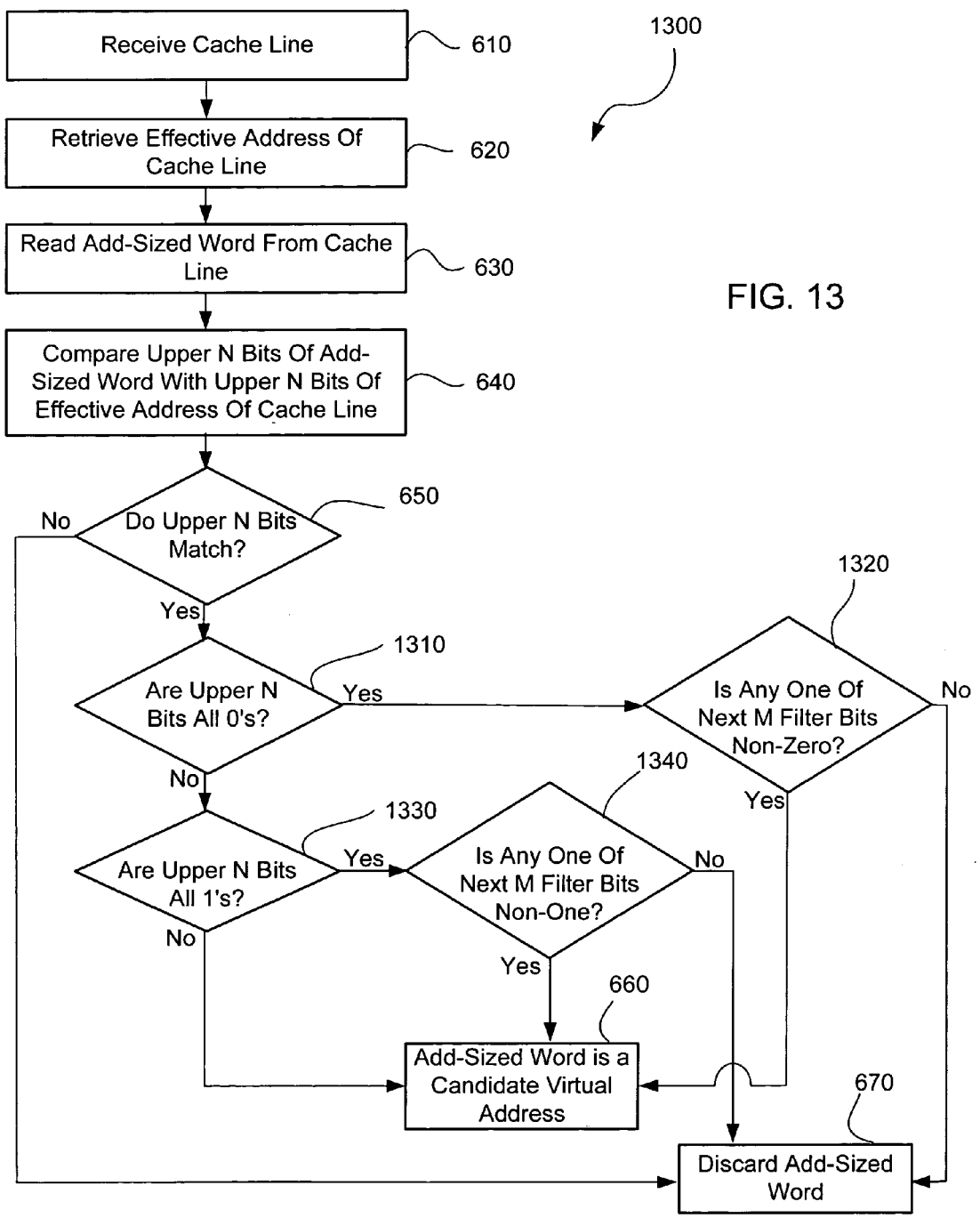
FIG. 13 is a flow chart illustrating a further embodiment of the method of identifying candidate virtual addresses.

A method 1300 of identifying candidate virtual addresses utilizing filter bits is illustrated in FIG. 13. The method 1300 is similar to the method 600 of identifying candidate virtual addresses shown and described with respect to FIG. 6, and like elements retain the same reference numeral. As shown at reference numeral 610, the virtual address predictor 295 receives a cache line. Again, the cache line is included in a copy of fill content received at the content prefetcher 290. The effective address of the cache line is then retrieved, as shown at reference numeral 620. The cache line is scanned and an address-sized word is read (or otherwise accessed) from the cache line, as denoted by reference numeral 630.

Referring to reference numeral 640, the upper N bits of the address-sized word are then compared with the upper N bits of the effective address.

If the compare bits of the address-sized word and effective address of the cache line match—see reference numeral 650—and the upper N bits of the effective address are all 0's—see reference numeral 1310—the next M filter bits of the address-size word are examined. Referring to reference numeral 1320, if any one of the next M filter bits of the address-sized word is a non-zero bit, the address-sized word is a candidate virtual address (see reference numeral 660). If a non-zero bit is not found in the filter bit range, the address-sized word is discarded, as shown at 670. Similarly, if the compare bits of the address-sized word and effective address match—see reference numeral 650—and the upper N bits of the effective address are all 1's—see reference numeral 1330—the next M filter bits of the address-sized word are examined. As illustrated at reference numeral 1340, if any one of the next M filter bits of the address-sized word is a non-one bit, the address-sized word is a candidate virtual address (see reference numeral 660). If a non-one bit is not found in the filter bit range, the address-sized word is discarded, as denoted at 670.

The filter bit range may comprise any suitable number of bits. By way of example, for a 32-bit address-sized word, a filter bit range of between 1 and 4 bits is believed suitable. Employing no filter bits would result in no virtual address prediction when the compare bits of the effective address of a cache line are all 0's or all 1's, whereas increasing the number of filter bits relaxes the requirements for potential candidate virtual addresses.

Figure 14:
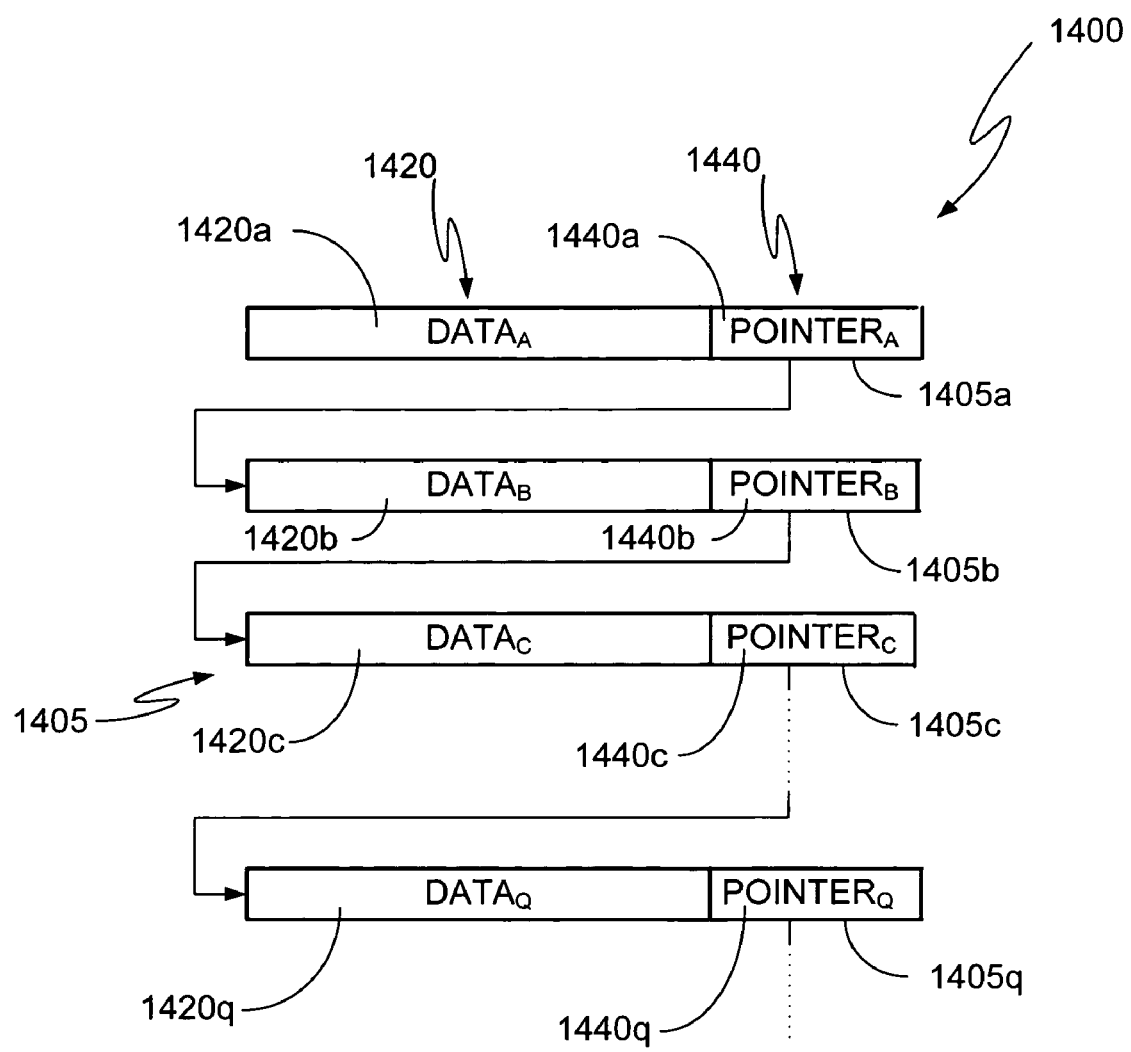
FIG. 14 is a schematic diagram illustrating an exemplary linked data structure.

Referring now to FIG. 14, a recursive or linked data structure 1400 is illustrated. The linked data structure 1400 comprises a number of elements 1405, such an element of a linked data structure sometimes referred to as a node instance. The linked data structure 1400 may include any desired number of elements 1405, such as, for example, elements 1405a, 1405b, . . . , 1405q. Each of the elements 1405a–q includes data 1420 and a pointer 1440. For example, the element 1405b includes data 1420b and a pointer 1440b.

The data 1420 contained in each element 1405 may comprise any information or data needed, or likely to be needed, by the CPU core 210. The pointer 1440 of each element 1405 identifies a memory address of the next successive element 1405 of the linked data structure 1400. For example, the element 1405b includes a pointer 1440b that identifies a memory address of the next element 1405c in the linked chain of elements of the recursive data structure 1400. Generally, the pointer of an element in a linked data structure is provided at the end of the element, and the pointer will point to (i.e., identify a memory address of) the beginning of the next element in the linked data structure. However, it should be understood that a pointer may lie anywhere within an element of a data structure and, further, that such a pointer may point to any position within the next element of the linked data structure. The disclosed embodiments are generally applicable to any data structure, irrespective of the particular arrangement of elements and/or pointers.

Thus far, it has herein been implicitly assumed that the size of an element of a data structure is equal to the size of a cache line. For example, with reference to the exemplary linked data structure 1400 of FIG. 14, it has been assumed that the size of each element 1405 is equivalent to the size of a cache line (e.g., 64 bytes or other suitable length). However, this assumption of equal sizes does not, in practice, always hold true. It is likely—and, in fact, common—that an element or node instance of a recursive data structure will span multiple cache lines. This relationship is illustrated in FIGS. 15 and 16 for the exemplary linked data structure 1400.

Figure 15:
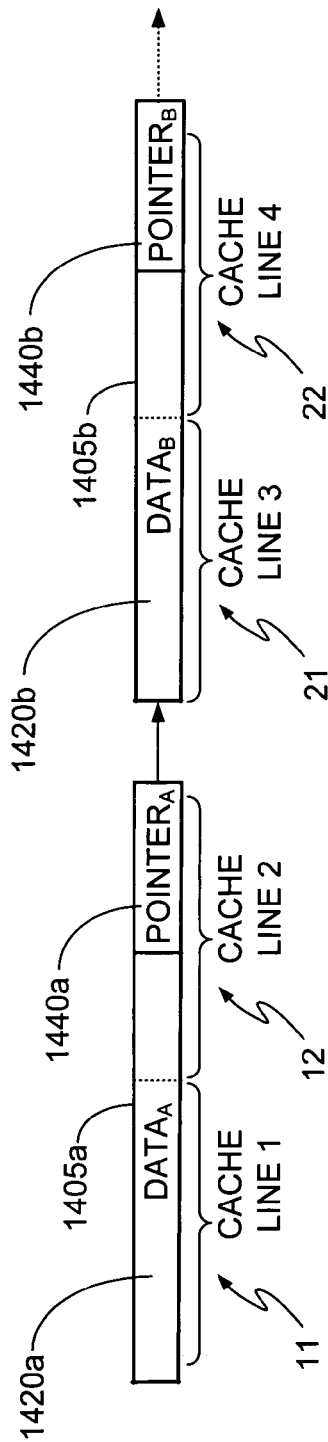
FIG. 15 is a schematic diagram illustrating a portion of the linked data structure of FIG. 14.
Figure 16:
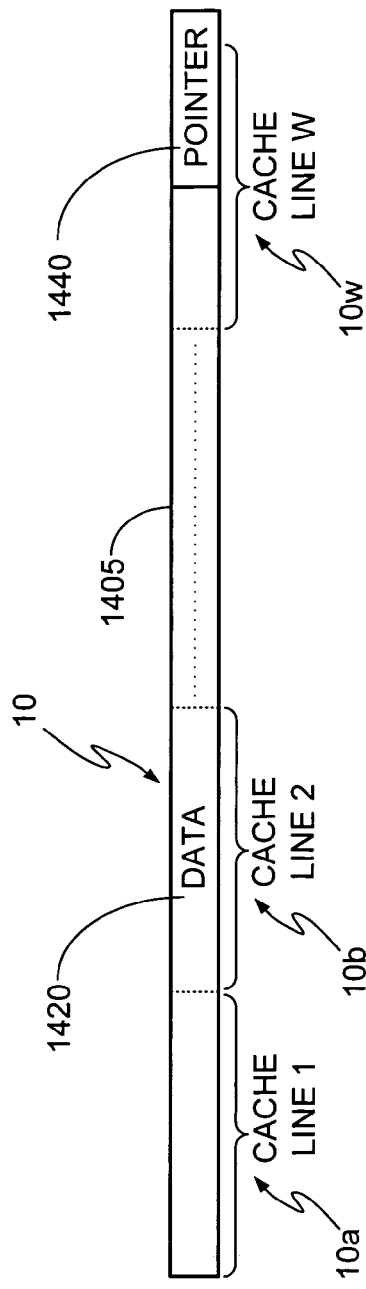
FIG. 16 is a schematic diagram illustrating an element of the linked data structure of FIG. 14.

Referring to FIG. 15, a first element 1405a and a second element 1405b of the linked data structure 1400 are shown. Again, each of the elements 1405a, 1405b includes data 1420a, 1420b and a pointer 1440a, 1440b, respectively. The pointers 1440a, 1440b each identify a memory address of the next element in the data structure 1400, wherein the pointer 1440a of the first element 1405a points to the second element 1405b. As illustrated in FIG. 15, the first element 1405a spans two contiguous cache lines 11, 12 (i.e., CACHE LINE 1, CACHE LINE 2). Similarly, the second element 1405b spans two contiguous cache lines 21, 22 (i.e., CACHE LINE 3, CACHE LINE 4), wherein the cache lines 12, 21 (CACHE LINE 2, CACHE LINE 3) may, or may not, be contiguous. As shown in FIG. 16, an element 1405 of the linked data structure 1400 may span any suitable number of cache lines. The element 1405 in FIG. 16—which includes data 1420 and a pointer 1440—spans a number of contiguous cache lines 10. Element 1405 may span any suitable number of cache lines 10, including, for example, contiguous cache lines 10a, 10b, . . . , 10w.

Returning to FIG. 15, if the content prefetcher 290 has identified a candidate virtual address that corresponds to the first element 1405a of data structure 1400, that candidate virtual address will correspond to the cache line 11 (again, the address of an element of a data structure generally points to the beginning of that element). Generally, the content prefetcher 290 will generate prefetch requests for a single cache line. Thus, a prefetch request will be issued only for the cache line 11, which will be loaded from memory and scanned for candidate virtual addresses (see FIGS. 3 through 5). Because the pointer 1440a to the next element 1405b of the data structure 1400 is contained in the cache line 12, this pointer 1440a will not be found and, hence, there is no prefetch transaction that references the element 1405b. The pointer 1440a will be identified only upon the occurrence of a cache miss at cache line 12.

In the event of a cache miss at cache line 12, this cache line will be loaded from memory and scanned for candidate virtual address by the content prefetcher 290. The scan of cache line 12 will reveal the pointer 1440a. Again, the content prefetcher 290 generally prefetches a single cache line and, as noted above, pointers identify a memory address of the beginning of an element. Thus, the pointer 1440a will lead to a prefetch of only cache line 21, and another cache miss at cache line 22 will have to occur before the pointer 1440b (pointing to the next element 1405c of data structure 1400) will be identified. Thus, the content prefetcher 290 will detect the presence of pointers 1440a, 1440b (as well as the other pointers 1440c–q) only if a cache miss occurs for their respective cache lines 12, 22.

As suggested above, in order to fetch from memory all (or a desired portion) of the elements 1405 of the recursive data structure 1400, a number of cache misses will be incurred. Generally, a cache miss is associated with a demand request and, therefore, corresponds to data currently needed by the CPU core 210. When a cache miss takes place, processor latency is incurred, as the CPU core 210 is "waiting" for any data that is the subject of the associated demand request. Thus, where the elements of a linked data structure need to be loaded from memory for use by the CPU core 210, and these elements each span multiple cache lines—thereby resulting in a large number of cache misses—processor latency is increased and, therefore, processing efficiency suffers.

Figure 17:
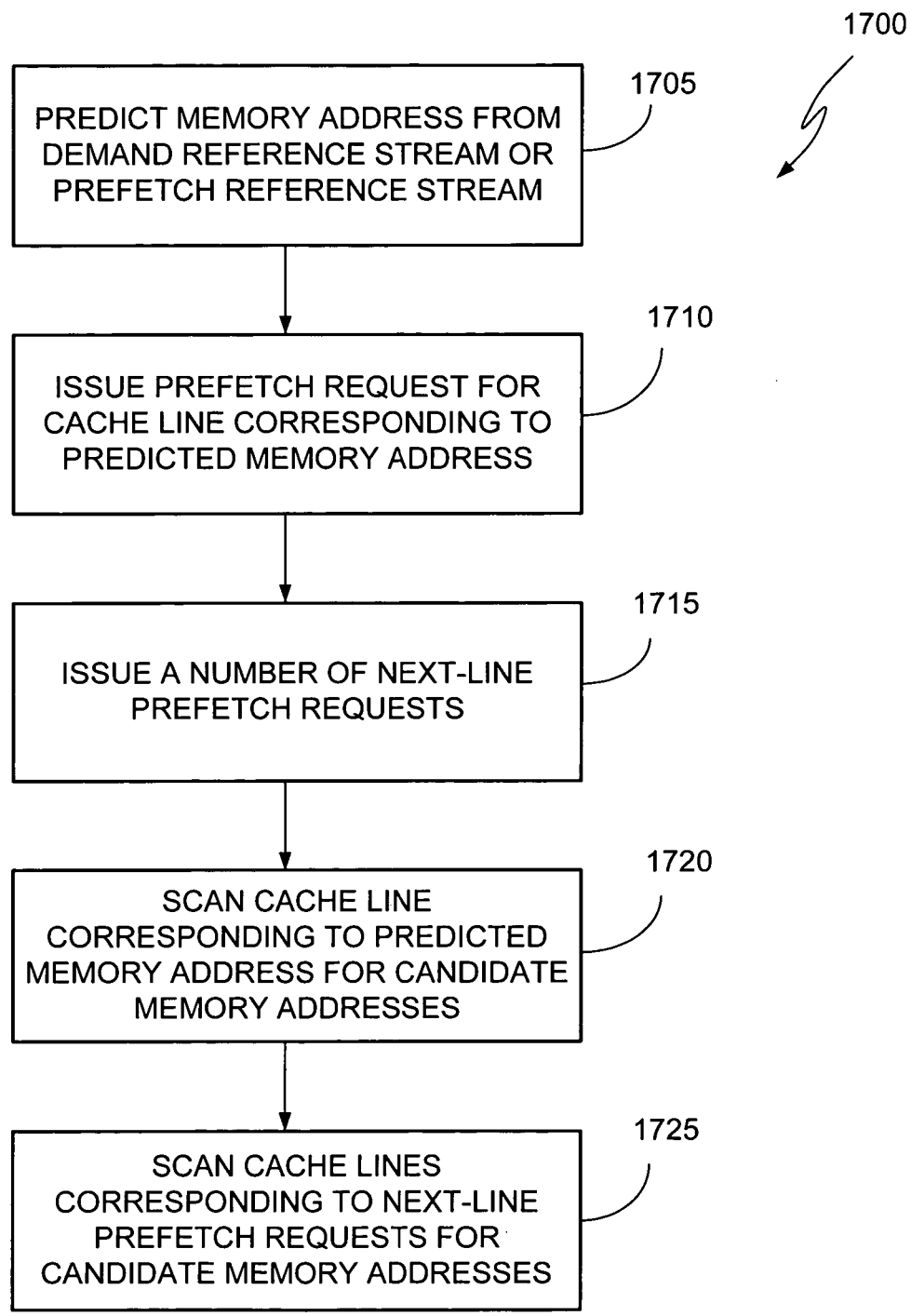
FIG. 17 is a schematic diagram illustrating an embodiment of a method of next-line prefetching from a predicted memory address.

An embodiment of a method 1700 of next-line prefetching from a predicted memory address, as may be implemented in an embodiment of content prefetcher 290, is illustrated in FIG. 17. When a candidate virtual address—or, more generally, any memory address—is identified or predicted by the content prefetcher 290, the method 1700 of next-line prefetching increases the width (in prefetched cache lines) of the subsequent prefetch memory transaction. Thus, the method 1700 of next-line prefetching from a predicted memory address may be used to prefetch the elements of a linked data structure, each of the structure's elements spanning multiple cache lines, while incurring minimal or no cache misses.

Referring now to block 1705 in FIG. 17, the content prefetcher 290 (and/or virtual address predictor 295) predicts a memory address—e.g., a virtual memory address— by scanning the fill content associated with the demand reference stream or the prefetch reference stream (see FIGS. 6 through 13 and accompanying text). As shown at block 1710, the content prefetcher 290 issues a prefetch request for a cache line identified by the predicted memory address. However, referring to block 1715, the content prefetcher 290 also issues a number of next-line prefetch requests. The first next-line prefetch request will load from main memory 120 (or other element of the memory hierarchy) a cache line having a memory address that directly follows, or is contiguous with, the predicted memory address. Each successive next-line prefetch request (if more than one) will load from memory a cache line having a memory address that directly follows, or is contiguous with, the cache line loaded on, or requested by, the preceding next-line prefetch request. Any suitable number of next-line prefetch requests may be issued following a prefetch request for a predicted address, each next-line prefetch request resulting in the prefetch of one additional, contiguous cache line. A number of next-line prefetch requests in the range of one (1) to four (4) is believed suitable.

Referring to block 1720, the content prefetcher 290 may scan the cache line (corresponding to the predicted address) for candidate addresses. As illustrated at block 1725, the content prefetcher 290 may also scan for candidate addresses the cache lines corresponding to the next-line prefetch requests. Based upon the results of these scans, the content prefetcher may issue additional prefetch requests and, for each additional prefetch request, one or more next-line prefetch requests. It should be noted that the prefetch reference stream will now include fill content associated with next-line prefetch requests. Therefore, referring back to block 1705 in FIG. 17, a predicted memory address may be found in a prefetch reference stream that includes fill content associated with prefetch requests and next-line prefetch requests.

Embodiments of a method 1700 for next-line prefetching from a predicted address—as well as an embodiment of a content prefetcher 290 implementing such a method—having been herein described, those of ordinary skill in the art will appreciate the advantages thereof. By issuing one or more next-line prefetch requests from a predicted memory address—each next-line prefetch request causing a cache line having a contiguous memory address to be prefetched— the elements of a linked data structure can be loaded into memory and made available to the CPU core without incurring a number of cache misses. Thus, processor latency is minimized and processing efficiency improved.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
    receiving a cache line, the cache line including a number of address-sized words;
    predicting a memory address based upon a comparison between data in the received cache line and an address of the received cache line, wherein the predicted memory address comprises one of the address-sized words of the cache line;
    issuing a prefetch request for a first cache line, the first cache line corresponding to the predicted memory address; and
    issuing a next-line prefetch request for a second cache line, the second cache line having a memory address contiguous with the predicted memory address.

2. The method of claim 1, further comprising scanning the first cache line for candidate memory addresses.

3. The method of claim 1, further comprising scanning the second cache line for candidate memory addresses.

4. The method of claim 1, further comprising issuing another next-line prefetch request for a cache line having a memory address contiguous with the memory address of the second cache line.

5. The method of claim 4, wherein a total number of next-line prefetch requests issued based upon the predicted memory address comprises from one to four next-line prefetch requests.

6. The method of claim 1, wherein the received cache line is associated with a demand reference stream.

7. The method of claim 1, wherein the received cache line is associated with a prefetch reference stream.

8. The method of claim 1, wherein the predicted memory address comprises a virtual address.

9. A device comprising:
    a cache memory; and
    a content prefetcher coupled with the cache memory, the content prefetcher to
        receive a cache line, the cache line including a number of address-sized words,
        predict a memory address based upon a comparison between data in the received cache line and an address of the received cache line, wherein the predicted memory address comprises one of the address-sized words of the cache line,
        issue a prefetch request for a first cache line corresponding to the predicted memory address, and
        issue a next-line prefetch request for a second cache line, the second cache line having a memory address contiguous with the predicted memory address.

10. The device of claim 9, the content prefetcher to scan the first cache line for candidate memory addresses.

11. The device of claim 9, the content prefetcher to scan the second cache line for candidate memory addresses.

12. The device of claim 9, the content prefetcher to issue another next-line prefetch request for a cache line having a memory address contiguous with the memory address of the second cache line.

13. The device of claim 12, wherein a total number of next-line prefetch requests issued based upon the predicted memory address comprises from one to four next-line prefetch requests.

14. The device of claim 9, wherein the received cache line is associated with a demand reference stream.

15. The device of claim 9, wherein the received cache line is associated with a prefetch reference stream.

16. The device of claim 9, wherein the predicted memory address comprises a virtual address.

17. A system comprising:
a bus;
a cache memory coupled with the bus; and
a processor coupled with the bus and the cache memory, the processor including a content prefetcher, the content prefetcher to
receive a cache line, the cache line including a number of address-sized words,
predict a memory address based upon a comparison between data in the received cache line and an address of the received cache line, wherein the predicted memory address comprises one of the address-sized words of the cache line,
issue a prefetch request for a first cache line corresponding to the predicted memory address, and
issue a next-line prefetch request for a second cache line, the second cache line having a memory address contiguous with the predicted memory address.

18. The system of claim 17, the content prefetcher to scan the first cache line for candidate memory addresses.

19. The system of claim 17, the content prefetcher to scan the second cache line for candidate memory addresses.

20. The system of claim 17, the content prefetcher to issue another next-line prefetch request for a cache line having a memory address contiguous with the memory address of the second cache line.

21. The system of claim 20, wherein a total number of next-line prefetch requests issued based upon the predicted memory address comprises from one to four next-line prefetch requests.

22. The system of claim 17, wherein the received cache line is associated with a demand reference stream.

23. The system of claim 17, wherein the received cache line is associated with a prefetch reference stream.

24. The system of claim 17, wherein the predicted memory address comprises a virtual address.

25. The system of claim 17, wherein the cache memory comprises part of the processor.

26. An article of manufacture comprising:
a medium having content that, when accessed by a device, causes the device to
receive a cache line, the cache line including a number of address-sized words;
predict a memory address based upon a comparison between data in the received cache line and an address of the received cache line, wherein the predicted memory address comprises one of the address-sized words of the cache line;
issue a prefetch request for a first cache line, the first cache line corresponding to the predicted memory address; and
issue a next-line prefetch request for a second cache line, the second cache line having a memory address contiguous with the predicted memory address.

27. The article of manufacture of claim 26, wherein the content, when accessed, further causes the device to scan the first cache line for candidate memory addresses.

28. The article of manufacture of claim 26, wherein the content, when accessed, further causes the device to scan the second cache line for candidate memory addresses.

29. The article of manufacture of claim 26, wherein the content, when accessed, further causes the device to issue another next-line prefetch request for a cache line having a memory address contiguous with the memory address of the second cache line.

30. The article of manufacture of claim 29, wherein a total number of next-line prefetch requests issued based upon the predicted memory address comprises from one to four next-line prefetch requests.

31. The article of manufacture of claim 26, wherein the received cache line is associated with a demand reference stream.

32. The article of manufacture of claim 26, wherein the received cache line is associated with a prefetch reference stream.

33. The article of manufacture of claim 26, wherein the predicted memory address comprises a virtual address.

* * * * *